United States Patent
Corbille et al.

(10) Patent No.: US 12,287,523 B2
(45) Date of Patent: Apr. 29, 2025

(54) FIBER-OPTIC SPLICE STORAGE TRAY

(71) Applicant: Corning Research & Development Corporation, Corning, NY (US)

(72) Inventors: Christophe Joseph Marie Corbille, Saint Nicolas de Redon (FR); Michel Teva Menguy, La Chevallerais (FR); Pierre-emanuel Marcel Picaud, Dreffeac (FR)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 201 days.

(21) Appl. No.: 17/957,494

(22) Filed: Sep. 30, 2022

(65) Prior Publication Data

US 2023/0094689 A1    Mar. 30, 2023

Related U.S. Application Data

(60) Provisional application No. 63/250,705, filed on Sep. 30, 2021.

(51) Int. Cl.
G02B 6/44    (2006.01)
(52) U.S. Cl.
CPC .................. *G02B 6/4454* (2013.01)
(58) Field of Classification Search
None
See application file for complete search history.

(56) References Cited

U.S. PATENT DOCUMENTS

| | | | | |
|---|---|---|---|---|
| 5,530,786 A * | 6/1996 | Radliff | ................. | G02B 6/4471 385/136 |
| 6,240,236 B1 | 5/2001 | Daoud | | |
| 6,249,636 B1 | 6/2001 | Daoud | | |
| 6,567,601 B2 * | 5/2003 | Daoud | ................. | G02B 6/4471 385/136 |
| 7,272,291 B2 * | 9/2007 | Bayazit | ................ | G02B 6/4454 385/137 |
| 7,274,852 B1 * | 9/2007 | Smrha | .................. | G02B 6/4454 385/136 |
| 8,009,954 B2 * | 8/2011 | Bran | .................... | G02B 6/4455 385/136 |
| 8,254,742 B2 * | 8/2012 | Womack | .............. | G02B 6/4471 385/136 |
| 9,207,422 B2 * | 12/2015 | Ray | ...................... | G02B 6/4454 |
| 9,575,278 B2 * | 2/2017 | Leclerc | ............... | G02B 6/4471 |
| 10,302,886 B2 * | 5/2019 | Kubinski | ............. | G02B 6/4453 |
| 2002/0191939 A1 * | 12/2002 | Daoud | ................. | G02B 6/4471 385/137 |

(Continued)

OTHER PUBLICATIONS

European Patent Application No. 22198500.5, Extended European search report dated Jan. 11, 2023; 9 pages; European Patent Office.

*Primary Examiner* — Jerry Rahll
(74) *Attorney, Agent, or Firm* — Tamika A. Crawl-Bey

(57) ABSTRACT

A fiber-optic storage tray is disclosed, comprising a fiber splicing portion; wherein the fiber splicing portion is configured to retain a plurality of optical fiber splices, such that adjacent optical fiber splices are offset with respect to one another in the direction of the depth of the tray and the adjacent optical fiber splices are also offset with respect to one another in the direction of their length.

19 Claims, 7 Drawing Sheets

(56) References Cited

U.S. PATENT DOCUMENTS

| | | | |
|---|---|---|---|
| 2008/0310811 A1* | 12/2008 | Gonzales | G02B 6/4455 |
| | | | 385/135 |
| 2010/0183274 A1 | 7/2010 | Brunet et al. | |
| 2019/0072736 A1* | 3/2019 | Glatzl | G02B 6/4471 |
| 2020/0073070 A1* | 3/2020 | Schoenfelder | G02B 6/4457 |
| 2023/0168455 A1* | 6/2023 | Corbille | G02B 6/4471 |
| | | | 385/135 |

* cited by examiner

FIBER-OPTIC SPLICE STORAGE TRAY

CROSS-REFERENCE TO RELATED APPLICATIONS

This application claims the benefit of priority of U.S. Provisional Application No. 63/250,705, filed Sep. 30, 2021, the content of which is relied upon and incorporated herein by reference in its entirety.

BACKGROUND

The present disclosure relates to the field of passive optical hardware and fiber-optic apparatuses. In particular, the technology of the disclosure relates to fiber-optic apparatuses for managing and connecting optical fibers.

Fiber-optic networks allow information to be transmitted via optical signals transmitted through optical fibers. Compared with traditional copper wiring, optical fibers allow transmission over greater distances with substantially less signal loss, provide a greater bandwidth, and do not suffer from electrical interference. Fiber-optic networks are particularly useful when providing long-distance communication and high bandwidth, so called "super-fast", broadband internet.

Typically, in a fiber-optic network a fiber optic cable is run from the network operator to a consumer premises (an outside plant, or OSP, cable). At the consumer premises, this cable is then split into a number of separate fiber-optic cables, each providing a network connection (inside plant, or ISP cables). Typically, this is done using a fiber-optic splitter, also known as an optical splitter or beam splitter. Exemplary beam splitters may divide a single input into 2, 4, 8, 16, or 32 output signals, and are known as 1×2, 1×4, 1×8, 1×16 and 1×32 splitters respectively.

The outputs of the beam splitters are typically for supplying individual consumer premises. For example, in this manner a fiber-optic broadband provider may lay a single fiber-optic cable to service a group of houses or business on a road or to service a block of flats. This cable may terminate in a street cabinet or wall terminal where the cable is split into a number of consumer fibers for servicing each individual house, business or flat.

To provide flexibility, for example because the number of premises subscribed to the fiber-optic broadband provider may change, the output fibers of the beam splitter are usually connected to the consumer fibers via fiber-optic connectors or connector adaptors. Many standard connector types exist, such as SC, LC, and MTO connectors. These connections also occur within the street cabinet or wall terminal, and allow an engineer to quickly connect or disconnect individual consumer fibers with the fiber-optic network.

Individual consumer fibers can also be temporarily connected to each other by connectors, or permanently connected by splicing at a splice. Optical fibers are commonly spliced to fix accidentally broken fibers or to join two fibers to create a fiber that is long enough for a required fiber run. There are two common methods of splicing optical fibers: arc fusion splicing and mechanical splicing. Fusion splicing uses a fiber fusion splicer to align the ends of the fibers and then melt and fuse them together with an electric arc. Mechanical splicing is quicker and easier to carry out, but mechanical splices are typically less robust and have higher optical losses. Both methods generally involve installing a tubular enclosure that protects the splice.

Fiber-optic storage trays (also known as cassettes), such as splice storage trays splice enclosures or splice organizers, provide secure and cost effective storage for optical fibers and splices. Such trays also protect the optical fibers from becoming damaged. Fiber-optic splice storage trays provide a junction between incoming and outgoing optical fibers which have been spliced together. A splice fiber-optic splice storage tray typically has a portion for locating the splices and a portion for storing excess fiber from the incoming and outgoing fibers.

Such fiber-optic storage trays that exist in the art have a number of drawbacks. Splicing in the field is where engineers spend a large portion of their time. With increasing demand for fiber-optic technology, space for the optical fibers and other associated components is at a premium. The trays are relatively large compared with the density of fiber housed therein due to the need to minimize tight bending angles. Additionally, multiple fiber-optic storage trays often have to be stacked to accommodate the required number of fiber-optic splices. This can make access difficult for engineers needing to work on the fibers or the splices within, for maintenance purposes. However, each time the splices or fibers are accessed there is a risk that the engineer may mistakenly disturb or damage the contents, leading to a loss of connection of the affected fibers.

SUMMARY

The invention is defined in the independent claim, to which the reader is now directed. Preferred or advantageous features are set out in the dependent claims.

According to a first aspect, a fiber-optic apparatus is provided for managing a plurality of optical fibers, the fiber optic apparatus comprising a housing and a fiber splicing portion, wherein the fiber splicing portion is configured to retain a plurality of optical fiber splices, such that adjacent optical fiber splices are offset with respect to one another in the direction of their length and the adjacent optical fiber splices are also offset with respect to one another in a depth direction that is perpendicular to the direction of the optical fiber splice lengths. The fiber splicing portion may be located on or within the housing.

According to a second aspect, a fiber-optic storage tray or cassette is provided. The fiber-optic storage tray comprises: a fiber splicing portion; wherein the fiber splicing portion is configured to retain a plurality of optical fiber splices, such that adjacent optical fiber splices are offset with respect to one another in the direction of the depth of the tray and the adjacent optical fiber splices are also offset with respect to one another in the direction of their length.

This arrangement provides a tray with an increased optical fiber density storage capacity without increasing the volume of the tray and without hindering access to the optical fibers. In particular, this arrangement increases capacity to store fiber-optic splices. More specifically, the offset of adjacent splices in the direction of the depth of the tray and also in the direction of their length may provide sufficient space in the fiber splicing portion to retain double the number of fiber-optic splices. The fiber-optic storage tray may generally be in the shape of a cuboid or may have any other suitable shape.

Optionally, the fiber splicing portion comprises a plurality of retaining members configured to retain the plurality of optical fiber splices.

These retaining members advantageously secure the fiber-optic splices and enable the tray to house and protect the fiber-optic splices. Furthermore, these retaining members also help to keep the splices and optical fibers within the tray organized and tidy, increasing splice and optical fiber density and reducing the likelihood of operator error when working on the splices or optical fibers.

Optionally, each respective optical fiber splice of the plurality of optical fiber splices is retained by a single respective retaining member of the plurality of retaining members.

In particular, each respective optical fiber splice of the plurality of optical fiber splices may be retained only by a single respective retaining member of the plurality of retaining members. This arrangement with only a single respective retaining member retaining each respective optical fiber splice may be facilitated by the offset of adjacent splices in the direction of the depth of the tray and in the direction of the length of the splices. In particular, the double offset of the optical fiber splices may enable each splice to be retained by a respective retaining member at only one end of the splice. Adjacent splices may be retained by respective retaining members at opposite ends of the splices. This may be advantageous for limiting the space occupied by the retaining members in the fiber splicing portion of the tray, thus maximizing the usable volume of the tray available for storing optical fiber splices.

Optionally, the plurality of retaining members are configured to retain the optical fiber splices in a parallel configuration with respect to each other.

Retaining the splices in a parallel configuration helps to keep the splices and optical fibers within the tray organized and tidy, providing easier access to the splices during routine maintenance work by an operator and reducing the likelihood of operator error when working on the splices or optical fibers. The parallel configuration of the splices may also optimize splice and optical fiber density in the tray.

Optionally, the plurality of retaining members are arranged in the fiber splicing portion in a first group of retaining members and a second group of retaining members. The first group of retaining members may be configured to retain a first group of optical fiber splices and the second group of retaining members may be configured to retain a second group of optical fiber splices. The first group of retaining members may have an equal number of retaining members as the second group of retaining members. Alternatively, the first group of retaining members and the second group of retaining members may have a different number of retaining members. Optionally, each one of the retaining members of the first group of retaining members and the second group of retaining members may be spaced equally from one another. Alternatively, each one of the retaining members of the first group of retaining members and the second group of retaining members may have unequal spacing from one another.

Optionally, the first group of retaining members is configured to retain a plurality of optical fiber splices at a first height relative to the tray and the second group of retaining members is configured to retain a plurality of optical fiber splices at a second height relative to the tray.

The first height relative to the tray and the second height relative to the tray may be different. The first height relative to the tray may be greater than the second height relative to the tray. This arrangement may help to create the offset of adjacent optical fiber splices with respect to one another in the direction of the depth of the tray.

Optionally, each retaining member of the first group of retaining members is configured to engage with a respective optical fiber splice at or near an end of said optical fiber splice closest to a first edge of the tray, as compared to the opposing end of the optical fiber splice, and each retaining member of the second group of retaining members is configured to engage with a respective optical fiber splice at or near an end of said optical fiber splice closest to a second edge of the tray, as compared to the opposing end of the optical fiber splice.

The first edge and the second edge of the tray may be opposing edges of the tray. The first and second edges of the tray may be parallel edges of the tray. Advantageously, this arrangement may help to optimize splice and optical fiber density in the tray.

Optionally, the first and second groups of retaining members are arranged in rows.

The first group of retaining members and the second group of retaining members may be disposed respectively in a first row of retaining members and a second row of retaining members. Alternatively, the first group of retaining members and the second group of retaining members may be disposed irregularly on the fiber splicing portion.

Optionally, the tray comprises a leverage portion, such as a raised portion or a segment of increased thickness proximate the first group of retaining members.

The leverage portion may advantageously provide additional support to the first group of optical fiber splices. The leverage portion may exert pressure on the optical fiber splices of the first group of optical fiber splices to push them up in their respective retaining member of the first group of retaining members. The resulting pressure from the retaining member on the optical fiber splice of the first group of optical fiber splices, coupled with the pressure of the leverage portion may create a leverage effect that biases the opposing end of the splice down into the tray. This may be beneficial for keeping the splices of the first group of splices in place securely where each respective splice is retained by a single retaining member at one end of the splice. This is particularly beneficial for the optical fiber splices of the first group of splices if they are retained at a first height relative to the tray, and the splices of the second group of splices are retained at a second height relative to the tray, and the first height is greater than the second height. In such embodiments the end of the splices of the second group which are not retained by the second group of retaining members of may advantageously be kept in place by the splices of the first group of splices which are retained above the second group of splices.

It will be appreciated that the leverage portion may be a first leverage portion and the tray may comprise a second leverage portion, such as a second raised portion or a second segment of increased thickness proximate the second group of retaining members.

The second leverage portion may advantageously provide additional support to the second group of optical fiber splices. The second leverage portion may fulfil the same function as the first leverage portion in respect of the second group of optical fiber splices with the same advantageous effects.

Optionally, the height of the first leverage portion above the surface of the tray is greater than the height of the second leverage portion. In particular, the height of the first raised portion may be greater than the height of the second portion, or correspondingly, the thickness of the first segment of increased thickness may be greater than the thickness of the second segment of increased thickness.

This arrangement may assist in retaining adjacent splices in a configuration in which they are offset in the direction of the depth of the tray.

Optionally, the tray further comprises a support portion to support the free ends of each of the plurality of optical fiber splices supported by the first group of retaining members.

The support portion may advantageously provide additional support to the optical fiber splices supported by the first group of retaining members, particularly when these are retained at a height which is higher than the height of the optical fiber splices supported by the second group of retaining members. If left unsupported, there is a risk that the splices could be accidentally moved by an operator, thereby affecting the optical signal carried by the spliced fiber. In particular, in the absence of support, if the free end of the splice is depressed, a leverage effect may be created by the clip, forcing the opposite end of the splice upwards. The support portion may reduce the likelihood of this occurring.

Optionally, the support portion comprises a plurality of protrusions, the support portion may have a number of protrusions equal to the number of retaining members of the first group of retaining members.

Optionally, the support portion may be a first support portion, and the tray may comprise a second support portion to support the free ends of each of the plurality of optical fiber splices supported by the second group of retaining members.

The height of the first support portion relative to the tray may be greater than the height of the second support portion relative to the tray. This arrangement may help to create the offset of adjacent optical fiber splices with respect to one another in the direction of the depth of the tray.

Optionally, the fiber splicing portion is configured to retain up to 12 optical fiber splices.

It will, however, be understood by a person skilled in the art that the arrangement of the optical fiber splices described herein, whereby splices are offset in the direction of the depth of the tray as well as in the direction of the length of the tray, may be applied to any number of splices.

Optionally, the tray further comprises an overlength fiber storage portion configured to retain coils of excess optical fiber.

The overlength fiber storage portion may be disposed adjacent to the fiber splicing portion. Placing the overlength fiber storage portion adjacent to the fiber splicing portion means that the optical fibers and optical fiber splices can be easily adjusted if necessary—for example if a splice needs to be redone. Such an overlength fiber storage portion has the advantage of enabling better fiber management. Such overlength cable storage portions can be used to store lengths of fiber-optic fiber. For example, the overlength fiber storage portion may provide storage space for up to 1 meters of optical fiber on each side of a splice. In more detail, in such an example configuration in which the fiber splicing portion is adapted to retain 12 optical fiber splices, the overlength fiber storage portion may provide sufficient storage space for up to 24 meters of optical fiber.

Optionally, the overlength fiber storage portion comprises at least one drum for coiling excess optical fiber.

The overlength fiber storage portion may comprise one or more drums for coiling excess optical fiber. The radius of the one or more drums may be greater than or equal to the safe bending curvature of an optical fiber to be stored and spliced in the fiber-optic storage tray. The radius of the drum may be 10 mm or greater, or 15 mm or greater, 20 mm or greater, or 30 mm or greater. Particular values for the radius of curvature may be 10 mm, 15 mm, 20 mm, 30 mm, or thereabouts in accordance with the safe bending rules for optical fiber.

Optionally, the tray further comprises a base having an external perimeter.

The base of the tray may be substantially planar and may also be generally rectangular in shape. This may advantageously minimize the need for tight angles when managing the optical fibers stored therein.

Optionally, the tray further comprises an outer wall extending from the base and at least partially around the perimeter of the base.

Optionally, the outer wall defines a fiber input region and a fiber output region.

Configurations in which the fiber input region and the fiber output region are discrete may provide a more organized and tidy arrangement which reduces the likelihood of operator error when working on the splices or optical fibers.

Optionally, the fiber splicing portion is a first fiber splicing portion, and the fiber-optic storage tray further comprises a second fiber splicing portion. In such an arrangement, the fiber-optic storage tray is dual tray and may advantageously have double the available volume for storing optical fiber splices.

The first fiber splicing portion and the second fiber splicing portion may both be configured to retain up to 12 optical fiber splices. Therefore, the tray may have the capacity to retain up to 24 optical fiber splices.

However, a person skilled in the art will understand that the features and arrangements of the tray, disclosed herein by way of exemplary embodiments, can be applied to any number of optical fiber splices.

Optionally, the overlength fiber storage portion is a first overlength fiber storage portion; and wherein the fiber-optic storage tray further comprises a second overlength fiber storage portion.

Such configurations with a first overlength fiber storage portion and a second overlength fiber storage portion have the advantage of having double the available optical fiber storage volume. Each of the first and second overlength fiber storage portions may provide sufficient storage for up to 24 meters of optical fiber, providing a total tray storage capacity of 48 meters.

Optionally, the tray further comprises a dividing wall, wherein the first fiber splicing portion and the first overlength fiber storage portion are located on a first side of the dividing wall; and wherein the second fiber splicing portion and the second overlength fiber storage portion are located on a second side of the dividing wall.

The dividing wall provides a physical barrier between the first side of the dividing wall and the second side of the dividing wall. The dividing wall may advantageously facilitate management and maintenance of the optical fibers associated with splices retained on the first fiber splicing portion and the second fiber splicing portion. In particular, the dividing wall may reduce the likelihood of operator error when working on the splices or optical fibers.

Optionally, the fiber-optic storage tray is symmetric along a line along the dividing wall.

Optionally, the fiber-optic storage tray includes one or more portions for holding fiber optic components other than fiber optic splices.

Optionally, the one or more portions for holding fiber optic components other than fiber optic splices includes one or more fiber optic splitter portions for holding fiber optic splitter components and/or one or more WDM portions for holding WDM components.

According to a third aspect fiber optic equipment housing such as a fiber housing box, break-out box, fiber closure or splice closure is provided and includes one or more trays as described in relation to the first aspect.

The first aspect may be implemented with any of the features of the second aspect.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to like components or parts.

Embodiments described in relation to the figures relate to a fiber-optic splice storage tray, being a tray that includes one or more splice storage portions, however it should be noted that any aspects of these embodiments could implemented as an alternative tray type such as a splitter tray or wavelength division multiplexer (WDM) tray that also includes one or more splice storage portions. That is, a fiber-optic splice storage tray as described herein may also include portions for holding or storing other fiber optic components such as splitters or WDM components such as multiplexers or de-multiplexers. In addition, it should be noted that the fiber optic splice portion described herein may be implemented in fiber optic equipment without being located on a tray at all. For example, one or more splice portions may be mounted or positioned on or within a housing of fiber optic equipment such as within a fiber optic cabinet or other fiber or cable management apparatus.

Figure 1:
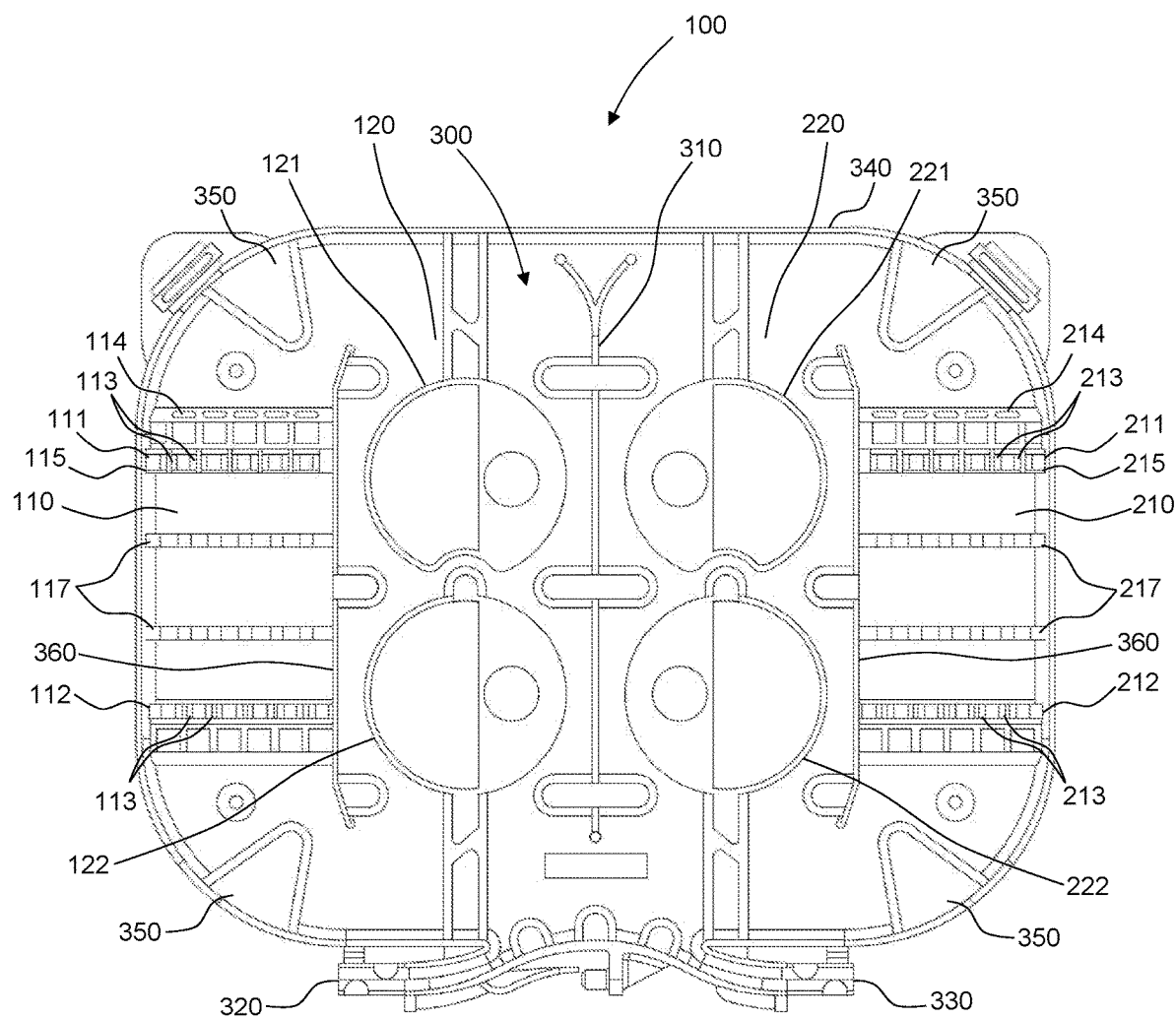
FIG. 1 illustrates a top view of an exemplary fiber-optic splice storage tray according to an embodiment.

FIG. 1 shows a top view of an exemplary fiber-optic splice storage tray 100 according to an embodiment.

As illustrated the tray 100 comprises first fiber splicing portion 110, a second fiber splicing portion 210, a first overlength fiber storage portion 120 and a second overlength fiber storage portion 220. The first fiber splicing portion 110 and the first overlength fiber storage portion 210 are disposed on a first side of the tray 100 and the second fiber splicing portion 120 and the second overlength fiber storage portion 220 are disposed on a second side of the tray 100.

The first fiber splicing portion 110 and the first overlength fiber storage portion 210 may be separated by a separating wall 360. The second fiber splicing portion 210 and the second overlength fiber storage portion 210 may be separated by a similar separating wall 360. These separating walls 360 may physically separate the splices retained on the fiber splicing portions 110, 210 from the fibers stored in the overlength fiber storage portions 120, 220. The first side of the tray and the second side of the tray are physically separated by a dividing wall 310 extending from the base 300 of the tray 100. The dividing wall may help to avoid mixing of optical fibers on the first side of the tray and the second side of the tray. As an alternative, the tray 100 may only have one fiber splicing portion and one overlength fiber storage portion or more than two fiber splicing portions and more than two overlength fiber storage portions disposed upon it. The present disclosure contemplates that the tray 100 may have any number and combination of fiber splicing portions and overlength fiber storage portions depending upon the requirements of a particular use case. It is also noted that the tray 100 may have any number of dividing walls to separate fiber splicing portions and overlength fiber storage portions. However, it has been found that the illustrated tray 100 with two fiber splicing portions 110, 210, and two overlength fiber storage portions 210, 220, separated by a dividing wall 310 is advantageous in its compactness and ability to fulfil a broad range of use case requirements. The tray 100 illustrated is symmetric about the dividing wall 310. However, it is also contemplated that the tray 100 may not be symmetric.

The fiber splicing portions 110, 210, are configured to retain and/or secure an optical fiber splice. The fiber splicing portions 110, 210, may be configured to retain and/or secure a specific type or types of splice, or may be configured to retain and/or secure any type of splice. For example, the fiber splicing portions 110, 210, may be configured to retain and/or secure a mechanical splice and/or a fusion splice, either of which may or may not be in a protective casing to protect the splice. The fiber splicing portions 110, 210, may be configured to retain and/or secure a single optical fiber splice, or multiple optical fiber splices. The fiber splicing portions 110, 210, may be configured to retain and/or secure the same number of optical fiber splices or different numbers of optical fiber splices.

The first and second fiber splicing portions 110, 210, both comprise a respective retaining member 113, 213 configured to retain an optical fiber splice. The first and second fiber splicing portions 110, 210, may comprise a single retaining member 113, 213 or multiple retaining members 113, 213. A retaining member may be clip, a clasp, a fastener, a latching mechanism or any other suitable retention means. In embodiments with multiple retaining members, the retaining members 113, 213 may all be of the same type or may be any combination of clips, clasps, fasteners, a latching mechanisms or any other suitable retention means. In the illustrated embodiment the first and second fiber splicing portions 110, 210 comprise retaining members 113, 213 in the form of a plurality of clips. The first and second fiber splicing portions 110, 210 may have the same number of retaining members 113, 213, or a different number of retaining members. A single retaining member 113, 213, of the first or second fiber splicing portions 110, 210 may retain a single optical fiber splice. Alternatively, a single retaining member 113, 213 may retain multiple optical fiber splices or multiple retaining members 113, 213, may retain a single optical fiber splice. As illustrated, the first and second fiber splicing portions have multiple retaining members 113, 213.

In embodiments in which the first and second fiber splicing portions have multiple retaining members 113, 213, the retaining members 113, 213 may be arranged in a first group of retaining members 111, 211 and a second group of retaining members 112, 212. The first group of retaining members 111, 211 and a second group of retaining members 112, 212 may have two or more retaining members 113, 213. The first group of retaining members 111, 211, and a second group of retaining members 112, 212 may have the same or a different number of retaining members. The first group of retaining members 111, 211, and a second group of retaining members 112, 212 may be defined by the relative position of the retaining members. For example, the retaining members of the first group of retaining members 111, 211, and the retaining members of the second group of retaining members 112, 212, may be spaced proximate to one another and interleaved with one another or may be defined by their position relative to other components or features of the tray 100. In the illustrated embodiment, the first group of retaining members 111, 211, are located proximate the top wall of the tray 100 and the second group of retaining members 112, 212 are located proximate the bottom wall of the tray 100.

In the tray illustrated in FIG. 1, the first group of retaining members 111, 211 and the second group of retaining members 112, 212 are each arranged in a row of retaining members 113, 213. However, it will be appreciated that the first group of retaining members 111, 211 and the second group of retaining members 112, 212 may be arranged in a plurality of rows or any other suitable configuration.

The retaining members 113, 213 illustrated are arranged such that they retain optical fiber splices in a parallel configuration. However, it will be appreciated that the retaining members 113, 213 may be configured to retain optical fiber splices in any other non-parallel configuration.

The fiber splicing portions 110, 210 of the embodiment illustrated in FIG. 1 have a leverage portion in the form of a segment of increased thickness 115, 215 proximate the first group of retaining members 111, 211. It is noted that the segment of increased thickness 115, 215 may be in the form of a single continuous segment or in the form of a plurality of segments of increased thickness.

The fiber splicing portions 110, 210 of the embodiment illustrated in FIG. 1 also have a guide 117, 217 for guiding the optical fiber splices retained on the fiber splicing portion, maintaining the optical fiber splices in the desired orientation and in which the fiber splices rest when installed. The fiber splicing portions 110, 210 may have a single guide 117, 217. Alternatively, the fiber splicing portions 110, 210 may have a plurality of guides 117, 217 or the fiber splicing portions 110, 210 may have no guide. The fiber splicing portions 110, 210 of the illustrated embodiment each have two guides 117, 217. In this embodiment, the two guides 117, 217 of each fiber splicing portion are disposed between the first group of retaining members 111, 211 and the second group of retaining members 112, 212. The two guides 117, 217 of each fiber splicing portion may be distributed evenly on the fiber splicing portions 110, 210. It will, however, be understood by a person skilled in the art that the guides 117, 217 may be disposed at any suitable location on the fiber splicing portion 110, 210.

As illustrated in this exemplary embodiment, the fiber splicing portions 110, 210 may optionally also have respective support portions 114, 214. These support portions 114, 214 are configured to support a free end of the optical fiber splices retained by the first group of retaining members 111, 211. The support portion 114, 214 may be a portion of increased thickness of the tray 100. The support portions 114, 214 of this embodiment comprise a plurality of protrusions each corresponding to, and in line with, a retaining member 113, 213 of the first group of retaining members. However, it will be appreciated that the support portion 114, 214 may be made up of any number of protrusions or may be a single raised strip or strip of increased thickness.

The features of the fiber splicing portion 110, 210, in particular, the retaining members 113, 213, the segments of increased thickness 115, 215, the supports 117, 217 and the protrusions 114, 214 will be discussed in more detail below in respect of FIGS. 3, 4, 5 and 6.

In the example of FIG. 1, the tray 100 has a fiber routing portion 350 disposed adjacent the fiber splicing portion 110, 210. The fiber routing portion 350 is configured to guide, secure and/or retain optical fibers. The fiber routing portion 350 is configured to guide the optical fibers from the overlength fiber storage portion 120, 220, to the fiber splicing portion 110, 210, without excessive bending. Each fiber splicing portion 110, 210 may have one or more associated fiber routing portions 350.

Overlength fiber storage portions 120, 220 can be used to store excess lengths of fiber. For example, many optical fiber splices have an attached length of optical fiber at each end of the splice. This length is often more than required, and so excess length can be coiled in an overlength fiber storage portion 120, 220. As illustrated in FIG. 1, the overlength fiber storage portions 120, 220 each have two drums 121, 122, 221, 222 around which excess lengths of fiber can be coiled. The drums are sized so as to avoid excessive bending of the fibers. It should be noted that any number of drums can be used for such a purpose in an overlength fiber storage portion. Tray 100 may have any number of overlength fiber storage portions 120, 220, depending upon the use requirements, though in the example illustrated in FIG. 1, the tray 100 has two overlength fiber storage portions 120, 220, one on each side of the tray 100. This has been found to be advantageous because it provides a space to store excess length for the optical fibers from each of the fiber splicing portions 110, 210. It is also advantageous to have the overlength fiber storage portions 120, 220 located nearby or adjacent to the fiber splicing portion 110, 210 because it means that if, for example, a splice needs to be redone then the excess fiber is easily accessible and the new splice can be made without having to reroute large portions of fiber.

The tray 100 may have a base 300 with an outer wall 340 extending from the base 300 and at least partially around the perimeter of the base 300. The tray may be generally planar or may have any other suitable shape. The outer wall 340 may define a top wall, a bottom wall, and first and second opposed side walls of the tray. The outer wall 340 helps to retain one or more of fiber-optic cables, optical fibers, and optical fiber splices within the tray 100. The outer wall 340 may also help to protect the contents against ingress of moisture, dust, or other debris.

In the bottom wall of the tray 100, at least two openings are provided for the one or more optical fibers or one or more groups of optical fibers to pass to the interior of the tray 100 from the exterior of the tray 100 or vice versa. In this exemplary embodiment, a fiber input region 320 defines a first opening and a fiber output region 330 defines a second opening in the outer wall 340 of the tray 100. The fiber input region 320 may allow one or more input optical fibers or groups of optical fibers to pass from the exterior into the interior of the tray 100. The fiber output region 330 may allow one or more output optical fibers or groups of optical fibers to pass from the interior to the exterior of the tray 100. It is noted that while these openings of the fiber input region 320 and the fiber output region 330 are in the bottom wall of the tray 100 in this example, they could also be located in different locations, such as in the top wall, the first or second side wall, or even the base 300 of the tray 100, and need not be located in the same wall or side.

The openings of the fiber input region 320 and the fiber output region 330 may have just one aperture for a single fiber, or may have a number of different apertures for numerous fibers. The size of the apertures may be dependent upon the fibers that are to pass through the opening. For example, an opening of the fiber input region 320 or the fiber output region 330 that is intended to a group of fibers may have a single large aperture. An opening of the fiber input region 320 or the fiber output region 330 configured to accommodate a plurality of single fibers may have numerous smaller apertures. In some embodiments, the openings of the fiber input region 320 and the fiber output region 330 may provide a single large aperture, and inserts can be inserted into the large aperture to provide the appropriate number and sizes of sub-apertures for the required application.

Figure 2:
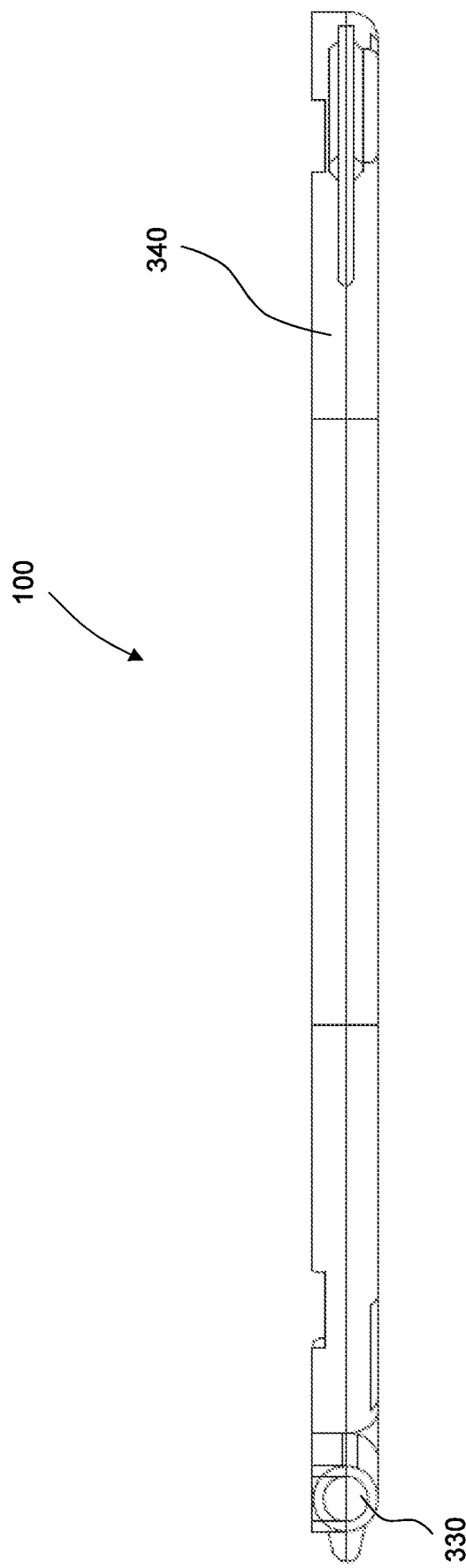
FIG. 2 illustrates a side view of an exemplary fiber-optic splice storage tray according to an embodiment.

FIG. 2 illustrates a side view of an exemplary fiber-optic splice storage tray 100 shown in FIG. 1. This view shows the outer wall 340 of the tray 100. The fiber output region 330 is also clearly shown which may allow one or more output optical fibers or groups of optical fibers to pass from the interior to the exterior of the tray 100. The features of the outer wall and the fiber output region are described above in respect of FIG. 1.

Figure 3:
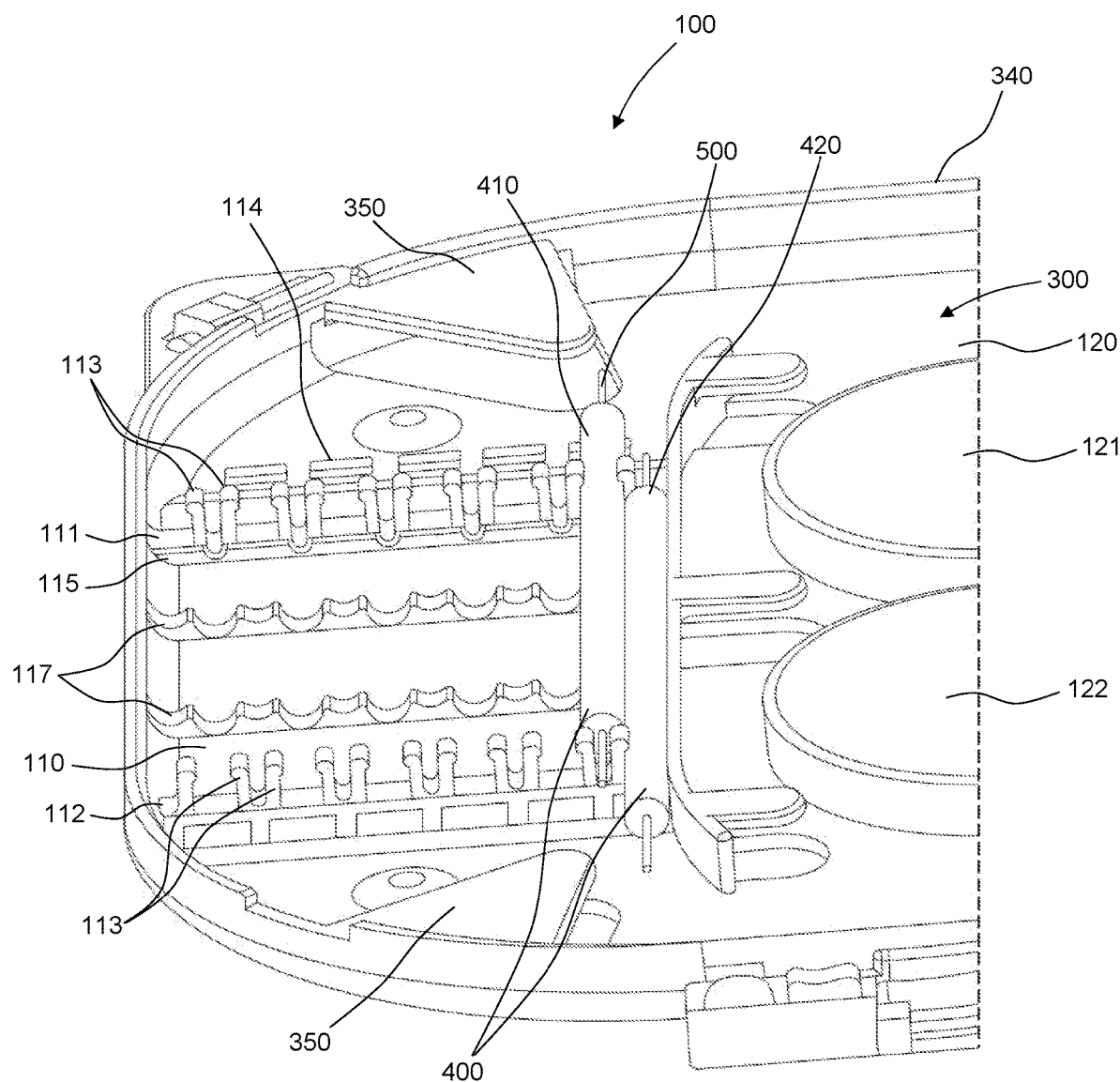
FIG. 3 illustrates a perspective view of a fiber splicing portion of an exemplary fiber-optic splice storage tray according to an embodiment including two optical fiber splices retained thereon.

FIG. 3 illustrates a perspective view of a fiber splicing portion 110 of the exemplary fiber-optic splice storage tray 100 of FIG. 1 according an embodiment, including two optical fiber splices 410 and 420 retained thereon with the extremities of the optical fibers 500 also shown.

For brevity, only features of the fiber splicing portion 110 revealed by this view which have not been mentioned previously will be discussed. However, it should be noted that the features of the fiber splicing portion 110 discussed above in respect of FIGS. 1 and 2 also apply to the fiber splicing portion of FIG. 3. It should also be noted that the features of the features discussed in respect of FIG. 3 also apply to the fiber splicing portion 210.

FIG. 3 shows that the retaining members 113 of this embodiment are clips which have resilient arms that extend away from the base 300 of the tray 100. The arms of the clips are attached at one end to the base 300 of the tray 100 and at the opposing free end have an overhanging portion configured to engage with the optical fiber splices 400. The clips are generally formed of two resilient arms that are spaced apart by a distance slightly larger than the width of an optical fiber splice 400 to restrict or prevent lateral movement of a splice 400 retained therein. The resilient arms are configured to deflect laterally to allow a splice 400 to be inserted. The arms then return to their original position and an overhanging portion at the free end of the arms engages with the splices 400 to retain then in the retaining member. The clips may only have one arm if the clip is adjacent to the outer wall 340 of the tray 100 or the separating wall 360. This is because the outer wall 340 and the separating wall 360 may act as a second arm of clip. This is the case with optical fiber splice 420 shown in FIG. 3 which is retained by a clip comprised of one arm and the separating wall 360. As shown is illustrated in FIG. 3, the arms of adjacent clips of a group of retaining members are spaced apart to accommodate the optical fibers of the splices retained by the other group of retaining members. It is noted that in alternative embodiments, each clip may only have one arm associated with each optical fiber splice. It is also noted, once again that a retaining member may be clip, a clasp, a fastener, a latching mechanism or any other suitable retention means.

The two optical fiber splices 410, 420 shown retained on the fiber splicing portion 110 in this embodiment, can be seen arranged in their double offset configuration, i.e. offset in the direction of the depth of the tray 100 and in the direction of the length of the splices 410, 420.

FIG. 3 shows that the leverage portion 115 in the form of a segment of increased thickness is directly adjacent the first group of retaining members 111. Alternatively, the leverage portion 115 may be spaced away from the first group of retaining members 111. In this example embodiment, the leverage portion has a plurality of circular cut-outs to accommodate the optical fibers 500 of the second group of optical fiber splices, such as splice 420. The number of cut-outs in the leverage portion is equal to the number of splices of the second group of optical fiber splices. In other embodiments, there may be any number of cut-outs in the leverage portion and the cut-outs may be of any suitable shape to accommodate the optical fibers 500.

FIG. 3 also shows an example of the shape of the guides 117 on the fiber splicing portion 110 of the tray 100. In this example embodiment, the guides 117 are raised segments of the splicing portion 110 and have a number of channels configured to hold the optical fiber splices 400 retained on the fiber splicing portion 110. As illustrated, the channels are circular cut-outs that conform to the shape of the optical fiber splices 400. However, in alternative embodiments, the guides 117 may have any shape suitable for holding the optical fiber splices in the desired orientation. The guides 117 have a number of channels equal to the number of optical fiber splices that can be retained on the fiber splicing portion 110 and each channel may be associated to an optical fiber splice 400. It will be appreciated the guides 117 may have any number of channels. In embodiments with more than one guide, the guides 117 may have the same shape or the guides 117 may be of different shapes. As shown, adjacent channels of the guides 117 are of different depths. The channels associated with the optical fiber splices of the first group of optical fiber splices, for example splice 410, may have a first depth. The channels associated with the optical fiber splices of the second group of optical fiber splices, for example splice 420, may have a second depth. The first depth may be less than the second depth.

This view of the fiber splicing portion 110 also illustrates an example shape of the support portion 114 configured to support a free end of the splices 400 of the first group of optical fiber splices. The support portion 114 of this embodiment comprises a plurality of protrusions each corresponding to, and in line with, a retaining member 113 of the first group of retaining members 111. However, as previously mentioned, it will be appreciated that the support portion 114 may be made up of any number of protrusions or may be a single strip of increased thickness.

Figure 4:
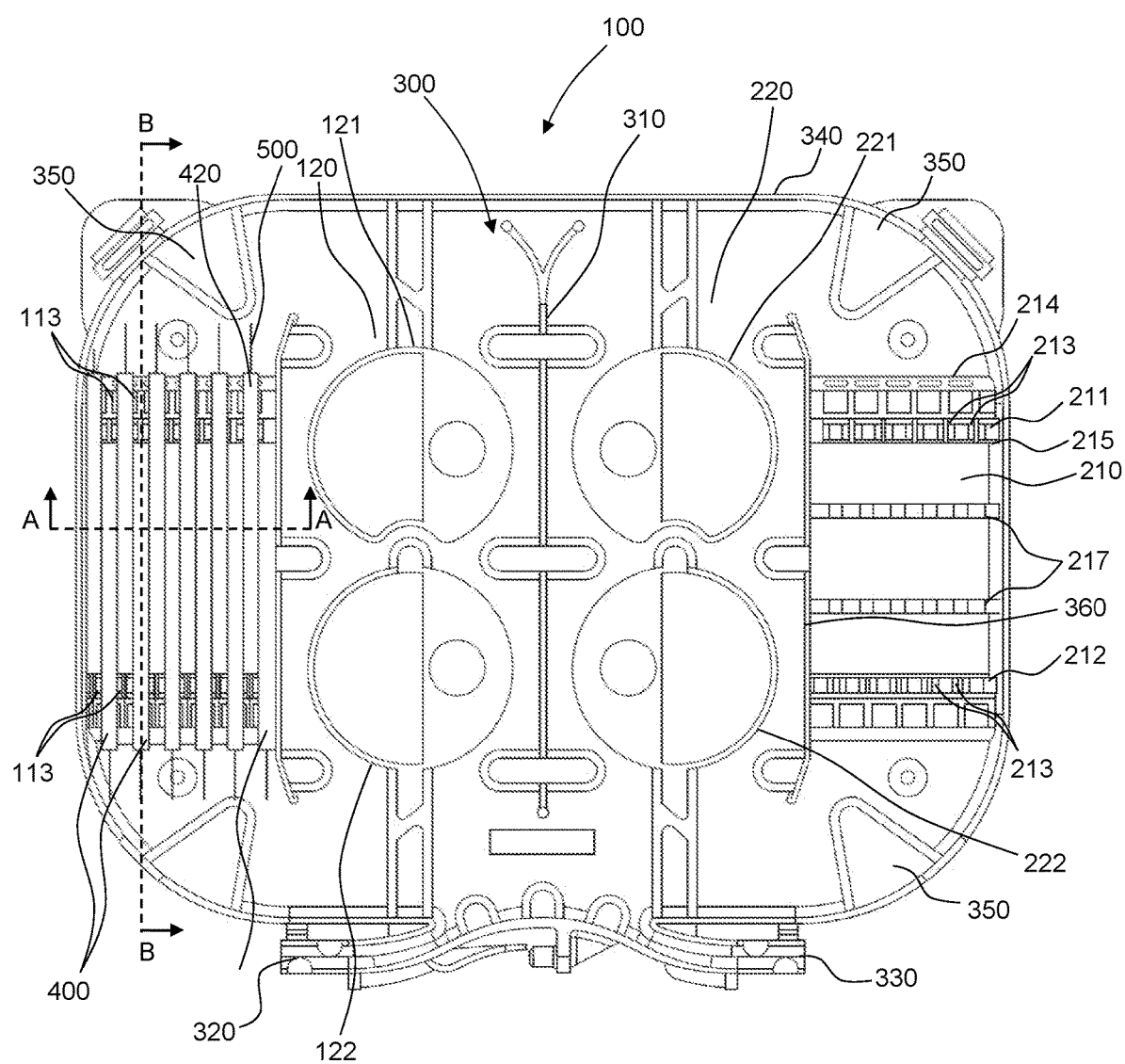
FIG. 4 illustrates a top view of an exemplary fiber-optic splice storage tray according to an embodiment including 12 optical fiber splices retained by a first fiber splicing portion.

FIG. 4 illustrates a top view of an exemplary fiber-optic splice storage tray 100 according to an embodiment including 12 optical fiber splices 400 retained by a first fiber splicing portion 110.

A number of the features of FIG. 4 are also present in FIG. 1 and will not be repeated for the sake of brevity. It should be noted that although 12 optical fiber splices 400 are retained on the fiber splicing portion 110, fewer than 12 splices 400 may be retained thereon. Alternatively, no splices may be retained thereon as is illustrated on fiber splicing portion 210.

FIG. 4 shows the first group of optical fiber splices offset from the second group of optical fiber splices in the direction of the length of the splices 400. For example, splice 410 is offset in the direction of its length from splice 420.

It will be understood by a person skilled in the art that, for simplicity, the example embodiments of FIGS. 3 and 4, only show the portions of the optical fibers 500 attached to the splices 400.

Figure 5:
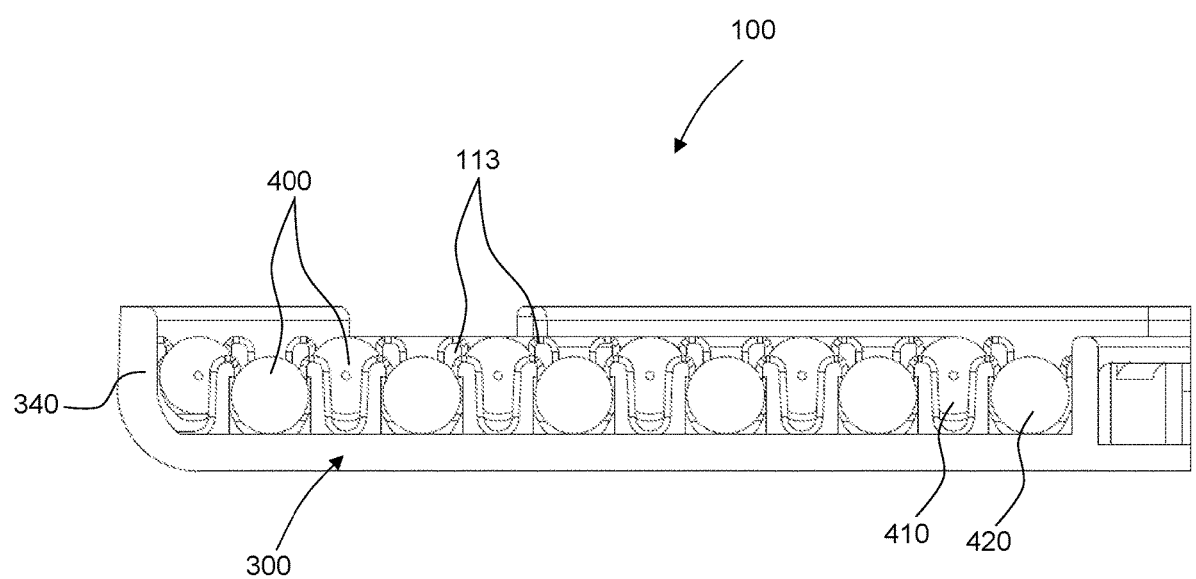
FIG. 5 illustrates a sectional view along line A-A of a fiber splicing portion of an exemplary fiber-optic splice storage tray according to an embodiment including twelve optical fiber splices retained thereon.

FIG. 5 illustrates a sectional view along line A-A of a fiber splicing portion of an exemplary fiber-optic splice storage tray 100 according to an embodiments including twelve optical fiber splices 400 retained thereon.

FIG. 5 shows that the height of the retaining members 113 of the first group of retaining members 111 is greater than the height of the retaining members of the second group of retaining members 112. Alternatively, the height of the retaining members 113 of the second group of retaining members may be greater than the height of the retaining members 113 of the first group of retaining members 111. Alternatively, the retaining members 113 of the first group of retaining members 111 and the retaining members 113 of the second group of retaining members 112 may have the same height.

FIG. 5 shows the relative height displacement between adjacent optical fiber splices 400 in the first and second groups of optical fiber splices. For example, splice 420 is retained in a lower position than splice 410 in the direction of the depth of the tray 100.

Figure 6:
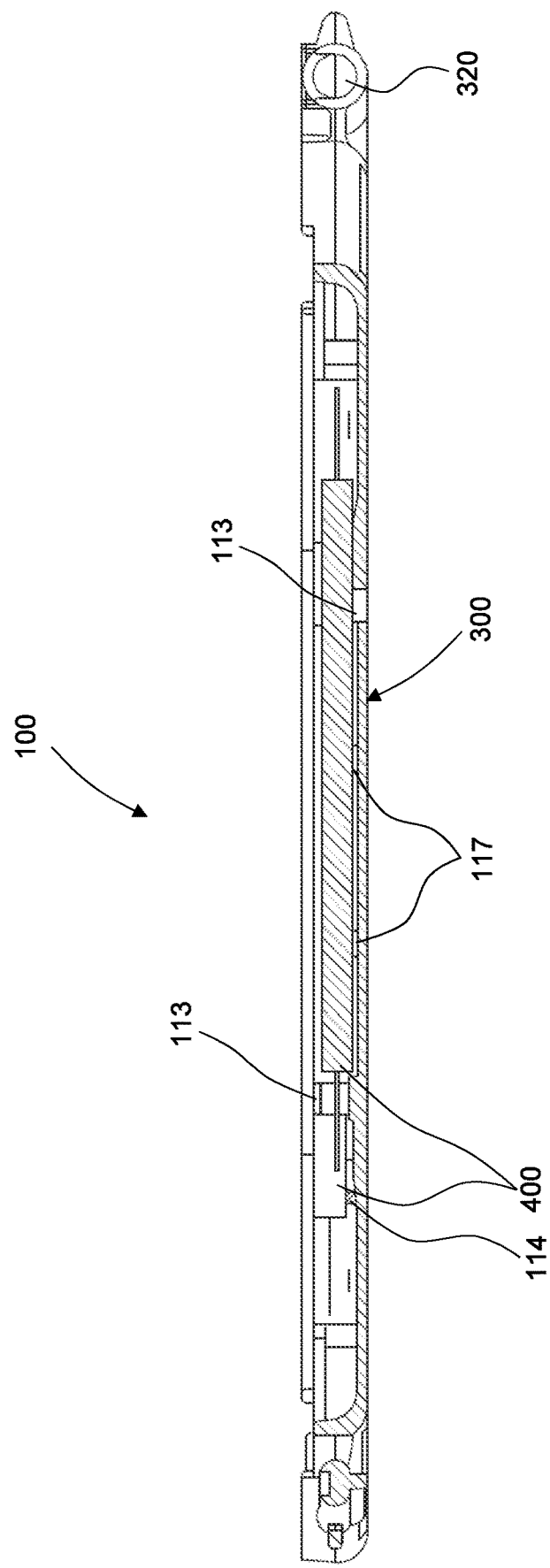
FIG. 6 illustrates a sectional view along line B-B of a fiber splicing portion of an exemplary fiber-optic splice storage tray according to an embodiment including twelve optical fiber splices retained thereon.

FIG. 6 illustrates a sectional view along line B-B of a fiber splicing portion of an exemplary fiber-optic splice storage tray according to an embodiment, including twelve optical fiber splices retained thereon. The relative height displacements between adjacent optical fiber splices in the first group and the second groups can clearly be seen. The relative displacements in a direction along the length of the optical fiber splices between adjacent optical fiber splices in the first group and the second groups can clearly be seen. Splice 410 is an example splice of the first group of splices and splice 420 is an example splice of the second group of splices.

Figure 7:
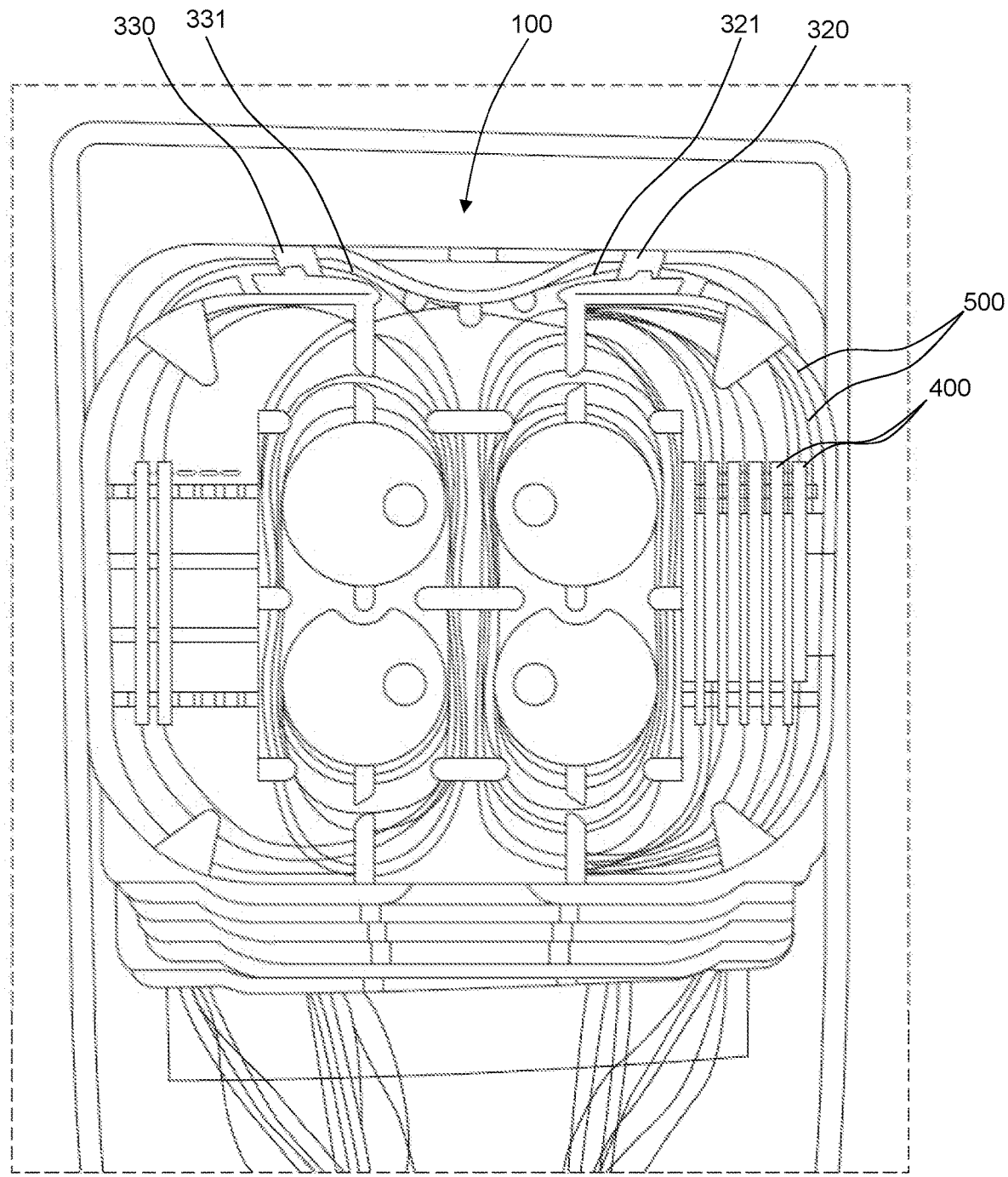
FIG. 7 illustrates an in situ perspective view along line A-A of an exemplary fiber-optic splice storage tray according to an embodiment including an exemplary optical fiber route within the tray.

FIG. 7 illustrates an in situ perspective view of an exemplary fiber-optic splice storage tray according to an embodiment including an exemplary optical fiber route within an optical fiber splice storage tray 100.

FIG. 7 shows a number of fiber splice storage trays 100 in a stacked configuration. An exemplary optical fiber route through the tray is shown in which an group of optical fibers 321 enters the fiber input region 320 of the tray 100 and individual optical fibers 500 from the input group of optical fibers 321 are routed through the first overlength fiber storage portion 120 and the second overlength fiber storage portion 220. The fibers 400 from the first overlength fiber storage portion 120 and the second overlength fiber storage portion 220 are then spliced with optical fiber splices 400 retained on the first fiber splicing portion 110 or the second fiber splicing portion 210 respectively. Once the fibers 400 have been spliced, the resulting fibers from the first splicing portion 110 and the second fiber splicing portion 210 are routed through the first overlength fiber storage portion 120 and the second overlength fiber storage portion 220 and exit the tray 100 in an output group of optical fibers 331 through the cable output region 330.

Any embodiments of the tray described herein may be installed within a fiber optic equipment housing such as a fiber housing box, break-out box, fiber closure or splice closure. Such closures can be provided in a range of sizes, they can be deployed above grade (pole, façade) or below grade (manhole, handhole). These closures can be used, for example, for fiber-to-the-Home (FTTH) deployments and any type of optical fiber cable deployment in the outside plant. Such enclosures may be formed as a weatherproof encasement, optionally made of plastic, that envelops the exposed area between spliced cables and that can be opened to provide access to the fibers inside.

As used herein, the terms "fiber-optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A fiber-optic storage tray comprising:
   a fiber splicing portion;
   a plurality of retaining members comprising arms configured to retain a plurality of optical fiber splices;
   wherein the fiber splicing portion is configured to retain a plurality of optical fiber splices, such that adjacent optical fiber splices are offset with respect to one another in the direction of the depth of the tray and the adjacent optical fiber splices are also offset with respect to one another in the direction of their length;
   wherein the plurality of retaining members are arranged in the fiber splicing portion in a first group of retaining members comprising a first row of the arms and a second group of retaining members, where some adjacent arms of the first row are spaced a first spacing configured to retain an exposed optical fiber and others of the adjacent arms are spaced a second spacing configured to retain a jacketed optical fiber, the first spacing being less than the second spacing.

2. A fiber-optic storage tray according to claim 1, wherein the fiber splicing portion is a first fiber splicing portion; and
   wherein the fiber-optic storage tray further comprises a second fiber splicing portion.

3. A fiber-optic storage tray according to claim 2, further comprising a dividing wall, wherein the first fiber splicing portion and the first overlength fiber storage portion are located on a first side of the dividing wall; and wherein the second fiber splicing portion and the second overlength fiber storage portion are located on a second side of the dividing wall.

4. A fiber-optic storage tray according to claim 1, wherein the plurality of retaining members are configured to retain the optical fiber splices in a parallel configuration with respect to each other.

5. A fiber-optic storage tray according to claim 1, wherein each respective optical fiber splice of the plurality of optical fiber splices is retained by a single respective retaining member of the plurality of retaining members.

6. A fiber-optic storage tray according to claim 1, wherein the first group of retaining members is configured to retain some of the plurality of optical fiber splices at a first height relative to the tray and wherein the second group of retaining members is configured to retain others of the plurality of optical fiber splices at a second height relative to the tray.

7. A fiber-optic storage tray according to claim 6, wherein each retaining member of the first group of retaining members is configured to engage with a respective optical fiber splice at or near an end of said optical fiber splice closest to a first edge of the tray and wherein each retaining member of the second group of retaining members is configured to engage with a respective optical fiber splice at or near an end of said optical fiber splice closest to a second edge of the tray.

8. A fiber optic storage tray according to claim 7, wherein the first and second groups of retaining members are arranged in rows.

9. A fiber-optic storage tray according to claim 8, wherein the tray further comprises a support portion to support the free ends of each of the plurality of optical fiber splices supported by the first group of retaining members.

10. A fiber-optic storage tray according to claim 9, wherein the support portion comprises a plurality of protrusions equal to the number of retaining members of the first group of retaining members.

11. A fiber-optic storage tray according to claim 6, wherein the tray comprises a leverage portion proximate the first group of retaining members.

12. A fiber-optic storage tray according to claim 1, wherein the fiber splicing portion is configured to retain up to 12 optical fiber splices.

13. A fiber-optic storage tray according to claim 1, further comprising an overlength fiber storage portion configured to retain coils of excess optical fiber.

14. A fiber-optic storage tray according to claim 13, wherein the overlength fiber storage portion comprises at least one drum for coiling excess optical fiber.

15. A fiber-optic storage tray according to claim 13, wherein the overlength fiber storage portion is a first overlength fiber storage portion; and wherein the fiber-optic storage tray further comprises a second overlength fiber storage portion.

16. A fiber-optic storage tray according to claim 1, further comprising a base having an external perimeter.

17. A fiber-optic storage tray according to claim 16, further comprising an outer wall extending from the base and at least partially around the perimeter of the base.

18. A fiber-optic storage tray according to claim 17, wherein the outer wall defines a fiber input region and a fiber output region.

19. A fiber-optic storage tray according to claim 1, wherein each retaining member of the plurality of retaining members comprises a clip including at least one of the arms with an overhang portion, the at least one of the arms configured to retain a first optical fiber splice and the overhang portion configured to overhang a second optical fiber splice.

* * * * *